(12) United States Patent
Lee et al.

(10) Patent No.: US 12,251,869 B2
(45) Date of Patent: Mar. 18, 2025

(54) CONTAINER FORMING APPARATUS, CONTAINER FORMING METHOD, CONTAINER, AND INSTANT FOOD PACKAGING METHOD USING CONTAINER

(71) Applicant: CJ CHEILJEDANG CORPORATION, Seoul (KR)

(72) Inventors: Byung Kook Lee, Seoul (KR); Hui Jae Song, Seoul (KR); Kyoung Sik Cho, Seoul (KR); Gyu Hwan Cha, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 946 days.

(21) Appl. No.: 17/258,548

(22) PCT Filed: Jun. 13, 2019

(86) PCT No.: PCT/KR2019/007137
§ 371 (c)(1),
(2) Date: Jan. 7, 2021

(87) PCT Pub. No.: WO2020/013463
PCT Pub. Date: Jan. 16, 2020

(65) Prior Publication Data
US 2021/0162649 A1 Jun. 3, 2021

(30) Foreign Application Priority Data
Jul. 9, 2018 (KR) .................. 10-2018-0079214

(51) Int. Cl.
*B29C 51/34* (2006.01)
*B29C 51/36* (2006.01)
(Continued)

(52) U.S. Cl.
CPC .............. *B29C 51/34* (2013.01); *B29C 51/36* (2013.01); *B29C 51/44* (2013.01); *B65B 25/001* (2013.01); *B65D 1/26* (2013.01); *B29L 2031/712* (2013.01)

(58) Field of Classification Search
CPC ........... B65D 1/26; B65B 47/04; B29C 45/40; B29C 2043/503; B29C 2043/5038; B29C 2045/4094; B29C 2045/4057
See application file for complete search history.

(56) References Cited

U.S. PATENT DOCUMENTS 4,071,598 A * 1/1978 Meadors ............. B29C 66/8322
264/296
5,695,706 A * 12/1997 Welsh ..................... B29C 45/44
425/577
(Continued)

FOREIGN PATENT DOCUMENTS

CN  1245034 A  2/2000
CN  102548861 A  7/2012
(Continued)

OTHER PUBLICATIONS

Chinese Office Action for CN Application No. 201980058615.0 mailed Sep. 6, 2022.
(Continued)

*Primary Examiner* — Andrew T Kirsch
(74) *Attorney, Agent, or Firm* — Merchant & Gould P.C.

(57) ABSTRACT

The present invention provides a container forming apparatus, a container forming method, a container, and an instant food packaging method using the container. The container forming apparatus, which is a container forming apparatus for forming a container by thermoforming, comprises: a bottom forming part for forming the bottom portion of the container; a side forming part extending upwardly inclined from the bottom forming part and configured to form a part (Continued)

of the side portion of the container; a first form part configured to rise upward and pressurize the container to separate and take out the formed container; and a second form part disposed outside the first form part and configured to form the remaining parts of the container except the part of the side portion.

8 Claims, 5 Drawing Sheets

(51) Int. Cl.
*B29C 51/44* (2006.01)
*B65B 25/00* (2006.01)
*B65D 1/26* (2006.01)
*B29L 31/00* (2006.01)

(56) References Cited

U.S. PATENT DOCUMENTS

| | | | |
|---|---|---|---|
| 9,387,970 B2 | 7/2016 | Cheong et al. | |
| 2002/0110615 A1* | 8/2002 | Ciccone | B29C 45/40 |
| | | | 425/DIG. 58 |
| 2007/0039918 A1 | 2/2007 | Lane et al. | |
| 2007/0252307 A1 | 11/2007 | Borst | |
| 2012/0152952 A1 | 6/2012 | Cheong et al. | |

FOREIGN PATENT DOCUMENTS

| | | |
|---|---|---|
| JP | H11-138624 A | 5/1999 |
| JP | 2001-301018 A | 10/2001 |
| JP | 2008-105230 A | 5/2008 |
| JP | 2011-218663 A | 11/2011 |
| KR | 20-2015-0001140 U | 3/2015 |

OTHER PUBLICATIONS

Chinese Office Action for CN Application No. 201980058615.0 mailed Mar. 23, 2022 (15 pages, with English translation).

Shun et al., "Plastic Forming Technology and Mold Design," Harbin University of Technology Press, 2008, p. 143 (4 pages, with English translation).

International Search Report and Written Opinion of the International Searching Authority for International Patent Application No. PCT/KR2019/007137 mailed Oct. 1, 2019, 11 pages.

* cited by examiner

CONTAINER FORMING APPARATUS, CONTAINER FORMING METHOD, CONTAINER, AND INSTANT FOOD PACKAGING METHOD USING CONTAINER

This application is a National Stage Application of PCT/KR2019/007137, filed 13 Jun. 2019, which claims benefit of Patent Application Serial No. 10-2018-0079214, filed 9 Jul. 2018 in Korea and which applications are incorporated herein by reference. To the extent appropriate, a claim of priority is made to each of the above-disclosed applications.

TECHNICAL FIELD

The present invention relates to a container forming apparatus, a container forming method, a container, and an instant food packaging method using a container, and more particularly, to a container forming apparatus, a container forming method, a container, and an instant food packaging method using a container with improved poor mold release.

BACKGROUND ART

In general, plastic forming methods are largely classified into a blow method, an injection method, and a thermoforming method. Among them, the thermoforming method is a method of making a cooling formed product by heating and softening a plastic sheet of a thermoplastic resin to deform the plastic sheet by an external force.

The thermoforming method includes pressure forming using compressed air, vacuum forming using vacuum air, and pressure vacuum forming using both compressed air and vacuum air. Recently, in order to increase the precision of forming, pressure vacuum forming using both pressure and vacuum has been generally used.

In the pressure vacuum forming, the plastic sheet is cut while forming and taken out from a mold and the forming s is performed at a high speed. Accordingly, a pressure vacuum forming apparatus needs to be made in a structure that is easily released from the mold, and cooling is important. In particular, in the case of forming a thin sheet, since there may be a problem such as crushing when taking out, a structure that is easily taken out is required.

Conventionally, a knock-out apparatus for discharging a container, which is a formed product, from a mold for thermoforming is manufactured in a small size on a surface where the bottom of the container contacts. However, according to the conventional method, it is not easy to take out the container during continuous production, and there is a problem that poor mold release occurs, such as a lot of crushing of the bottom surface of the container.

DISCLOSURE

Technical Problem

The present invention is derived to solve the above-described problems, and an object of the present invention is to provide a container forming apparatus, a container forming method, a container, and an instant food packaging method using a container capable of facilitating taking-out by pressing a side portion of the container to be included at the time of taking out, and improving poor mold release such as crushing of the bottom surface of the container.

Another object of the present invention is to provide a container forming apparatus, a container forming method, a container, and an instant food packaging method using a container capable of minimizing product defects due to contractional deformation of the container by increasing the strength of the side portion of the container.

Technical Solution

To achieve the object, according to the present invention, a container forming apparatus for forming the container by thermoforming includes a first mold part which includes a bottom forming part for forming a bottom portion of the container and a side forming part for extending to be inclined upward from the bottom forming part and forming a part of the side portion of the container and is lifted upward to separate and take out the container in which the forming is completed to press the container, and a second mold part which is disposed outside the first mold part and forms the remaining portion except for the part of the side portion.

Further, according to the present invention, a container forming method includes a heating step of heating a sheet to be formed into a container, a thermoforming step of press-fitting the heated sheet in a first mold part forming a part of a bottom portion and a side portion of the container and a second mold part provided outside the first mold part and forming the remaining portion except for the part of the side portion and coming into close contact with the first mold part and the second mold part by injection of compressed air and vacuum suction to form the bottom portion and the side portion, and a taking-out step of separating and taking out the container in which the forming is completed from the second mold part by lifting the first mold part upwardly.

Meanwhile, according to the present invention, a container includes a bottom portion, a side portion which is formed to be inclined upward from the bottom portion and includes a stepped portion protruding stepwise along a circumferential direction of an outer peripheral surface thereof, and an upper end portion which is provided at an upper side of the side portion and provided with a flange.

Meanwhile, according to the present invention, an instant food packaging method includes preparing a container, putting instant food into the container, sealing the container, and cooling the container, wherein the container includes a bottom portion, a side portion which is formed to be inclined upward from the bottom portion and includes a stepped portion protruding stepwise along a circumferential direction of an outer peripheral surface thereof, and an upper end portion which is provided at an upper side of the side portion and provided with a flange.

Advantageous Effects

According to the present invention, in the container forming apparatus and the container forming method, the first mold part serving as a knock-out has a structure formed by including not only the bottom portion of the container but also the side portion of the container to press the side portion of the container to be included when taking out. Accordingly, when the container is taken out, it is possible to facilitate the taking-out by further increasing a pressing force and improve poor mold release such as crushing of the bottom surface of the container.

Further, according to the present invention, since the stepped portion protrudes from the side portion of the container, the strength of the side portion of the container is reinforced, thereby minimizing product defects due to contractional deformation of the container.

BRIEF DESCRIPTION OF DRAWINGS

According to the present invention, in the container forming apparatus and the container forming method, the first mold part serving as a knock-out has a structure formed by including not only the bottom portion of the container but also the side portion of the container to press the side portion of the container to be included when taking out. Accordingly, when the container is taken out, it is possible to facilitate the taking-out by further increasing a pressing force and improve poor mold release such as crushing of the bottom surface of the container.

Further, according to the present invention, since the stepped portion protrudes from the side portion of the container, the strength of the side portion of the container is reinforced, thereby minimizing product defects due to contractional deformation of the container.

MODE FOR INVENTION

Hereinafter, preferred embodiments of the present invention will be described in detail with reference to the accompanying drawings.

First, embodiments to be described below are examples suitable for understanding technical features of a container forming apparatus, a container forming method, a container, and an instant food packaging method using a container according to the present invention. However, the present invention is not restricted and applied to the embodiments to be described below, or the technical features of the present invention are not limited by the embodiments to be described, and various modifications are possible within the technical scope of the present invention.

Figure 1:
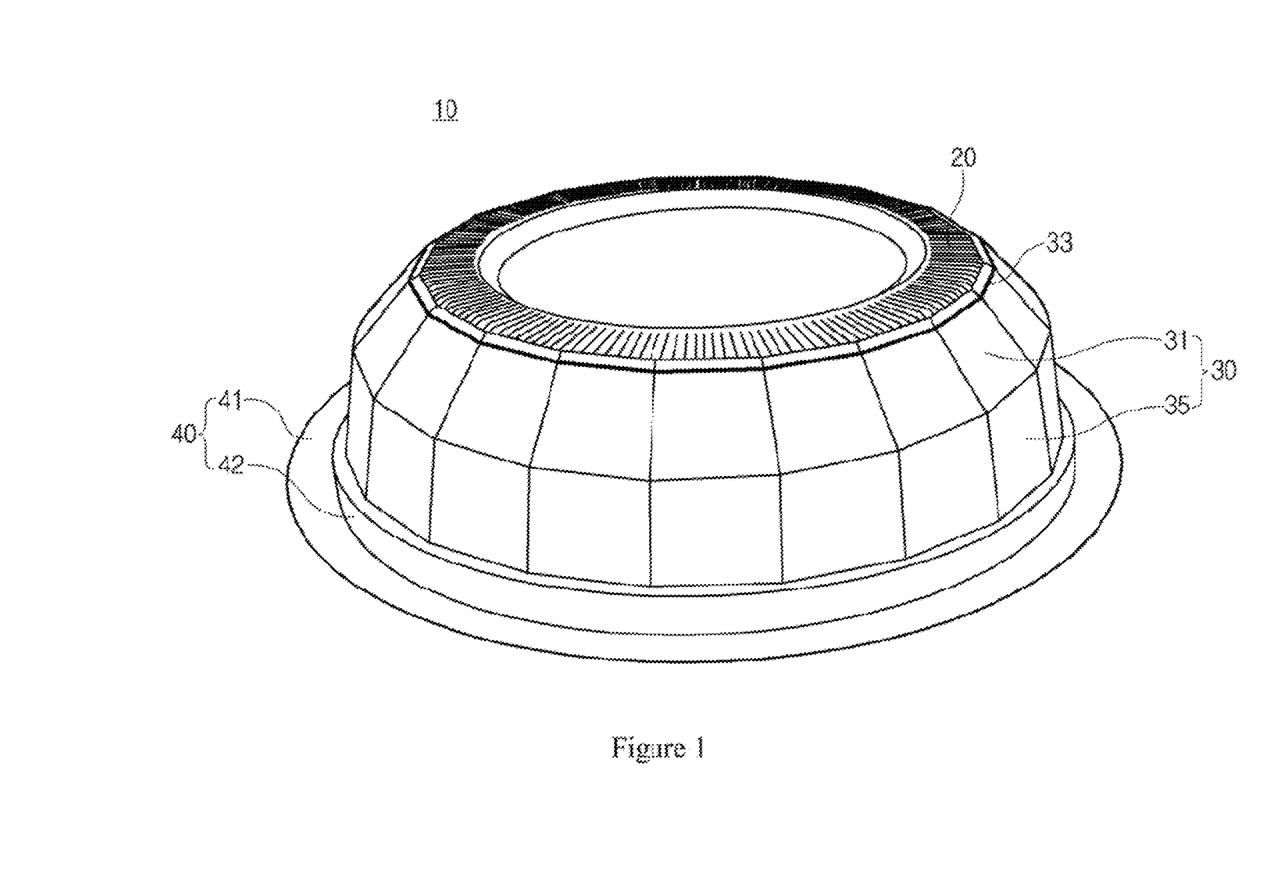
Figure 2:
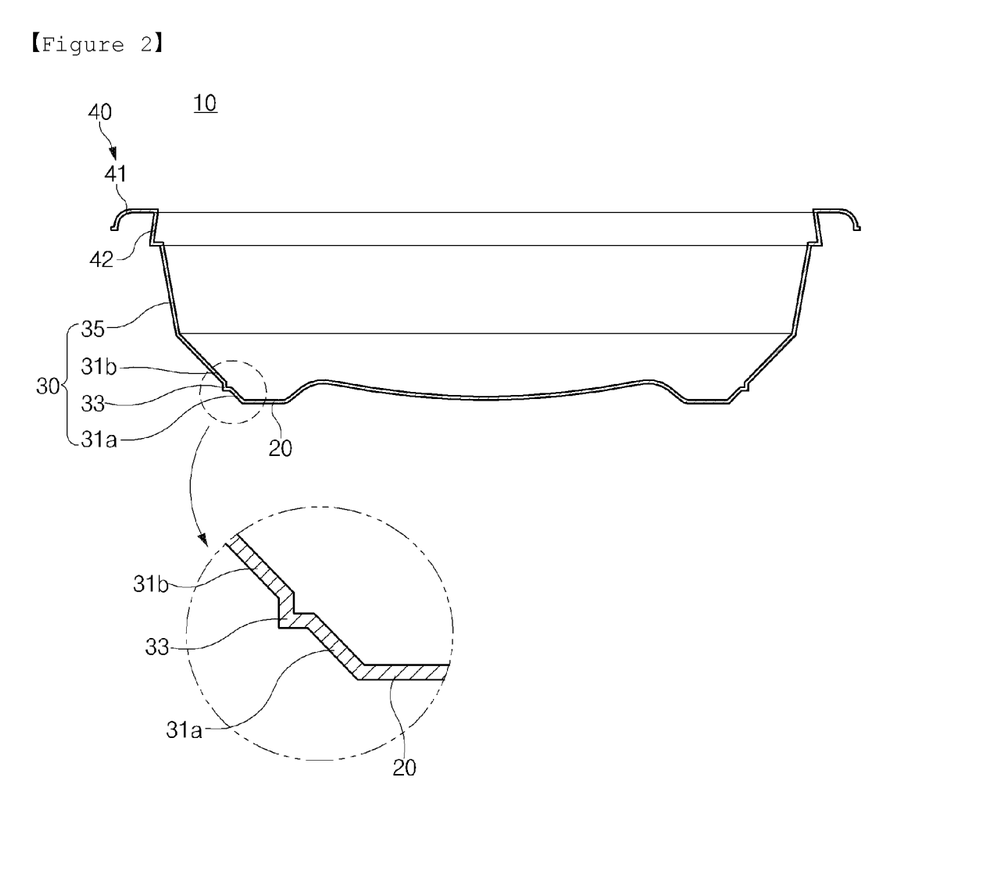
Figure 5:
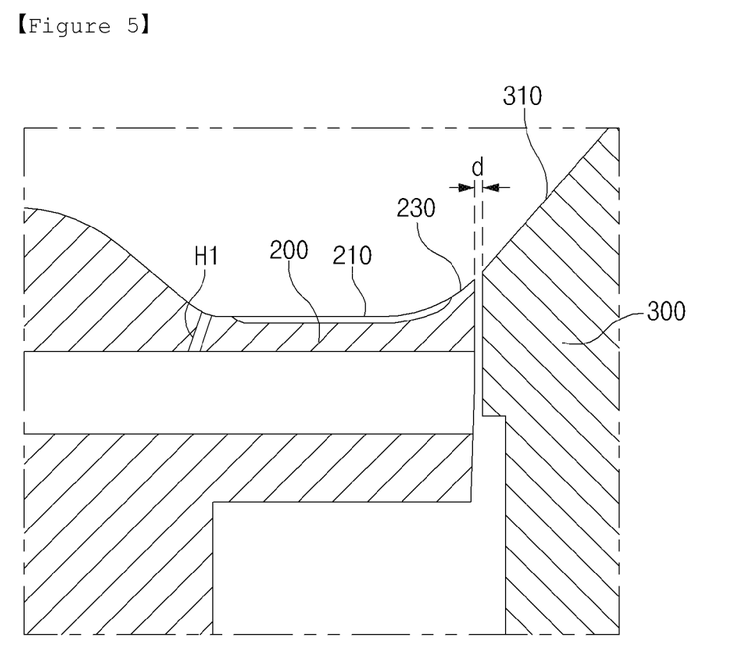
Figure 6:
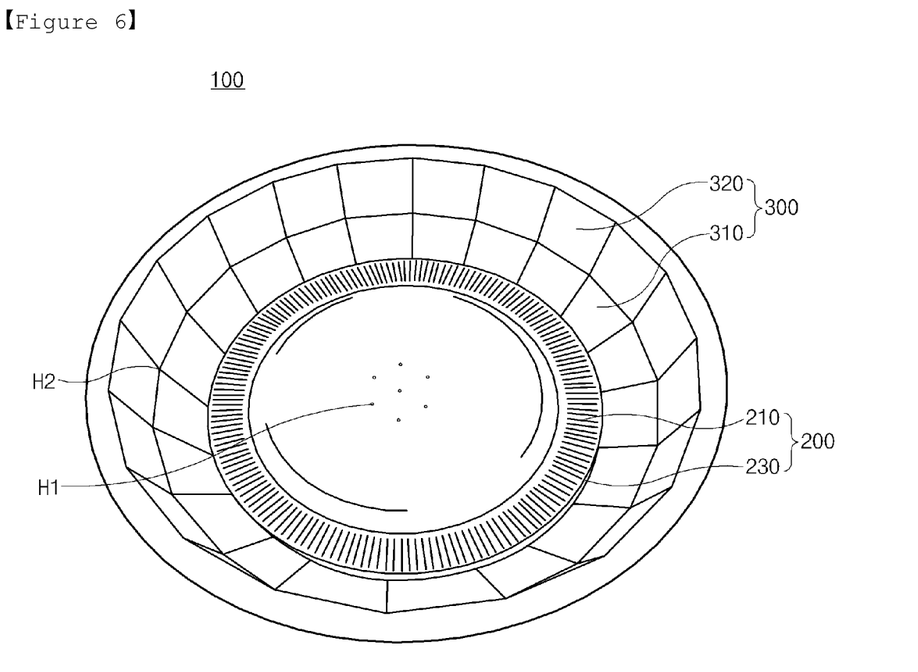
Figure 7:
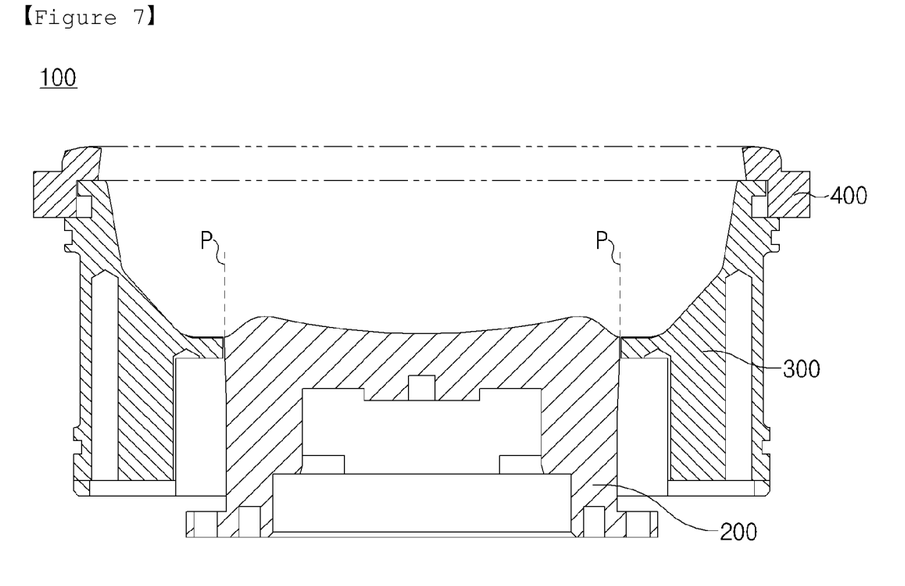
Figure 8:
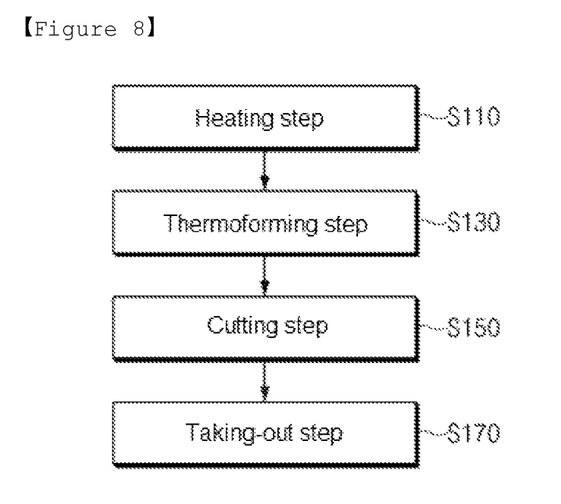

FIGS. 1 and 2 illustrate a container 10 formed by a container forming apparatus 100 according to the present invention and a method thereof, FIGS. 3 to 6 illustrates the container forming apparatus 100 according to the present invention, and FIG. 7 illustrates Comparative Example of the container forming apparatus 100 according to the present invention. FIG. 8 illustrates a flowchart of a container forming method according to the present invention.

Referring to FIGS. 1 and 2, the container 10 according to the present invention includes a bottom portion 20, a side portion 30, and an upper end portion 40.

The bottom portion 20 may be formed in various shapes as long as it may be seated on the ground. When the container 10 is placed on the ground, a portion in contact with the ground may be defined as a bottom surface of the bottom portion 20. In addition, an inclined portion may be formed on the inside and/or outside of the bottom surface in contact with the ground, but such an inclined portion may be included in the bottom portion 20 when the inclined portion is distinguished from a slope of the side portion 30. For example, the bottom portion 20 may include a finely inclined portion at a portion to which the bottom surface and the side portion 30 are connected, but this portion is in contrast to the slope of the side portion 30 and is configured as a part of the bottom portion 20.

The side portion 30 is formed to be inclined upward from the bottom portion 20 and includes a stepped portion 33 protruding stepwise along a circumferential direction thereof. Specifically, the side portion 30 may be a side wall which is connected to the bottom portion 20 to form an accommodation space in which the contents are accommodated. The side portion 30 may be formed to be inclined, and the stepped portion 33 may protrude in a strip shape along an outer circumferential surface of the side portion 30. Here, the stepped portion 33 may be formed adjacent to the bottom portion 20. The stepped portion 33 protrudes from the side portion 30 to reinforce the rigidity of the side portion 30 of the container 10.

The upper end portion 40 is provided on the upper side of the side portion 30 and provided with a flange 41.

Specifically, the upper end portion 40 may include a skirt 42 extending upward from the side portion 30 and a flange 41 connected to the skirt 42. If an angle of the skirt 42 is larger than that of the side portion 30 with respect to the bottom surface, the angle thereof is not limited. For example, the skirt 42 may be 90° or more, particularly 94° to 99°, and more particularly 96° to 97° from an extension line formed by extending the bottom surface in an outer direction of the container.

Here, the side portion 30 may include a first side surface 31 and a second side surface 35 provided in a vertical direction. The first side surface 31 extends to be inclined upward from the bottom portion 20, inclined at a first slope based on the bottom surface of the bottom portion 20, and formed with a stepped portion 33. The second side surface 35 extends to be inclined upward from the first side surface 31 and may be inclined at a second slope greater than the first slope with respect to the bottom surface.

The container 10 may be a container manufactured by thermoforming, and specifically, may be a container manufactured by pressure and/or vacuum. For example, the container 10 may be a container manufactured using the container forming apparatus 100 to be described below.

Referring to FIGS. 3 to 6, the container forming apparatus 100 according to the present invention is based on forming the container 10 by thermoforming, and includes a first mold part 200 and a second mold part 300.

Specifically, the container forming apparatus 100 according to the present invention may manufacture a container by thermoforming, and more specifically, may form a container by pressure vacuum forming. That is, a sheet may be formed by being in close contact with the first and second mold parts 200 and 300 by injection of compressed air and vacuum suction. However, the thermoforming method to be applied to the present invention is not limited thereto, and may be formed by, for example, at least one of injection of compressed air and vacuum suction.

The first mold part 200 includes a bottom forming part 210 for forming the bottom portion 20 of the container 10, and a side forming part 230 for extending to be inclined upward from the bottom forming part 210 and forming a part of the side portion 30 of the container 10. The first mold part 200 is lifted upward to separate and take out the container 10 in which the forming is completed to press the container 10.

Figure 3:
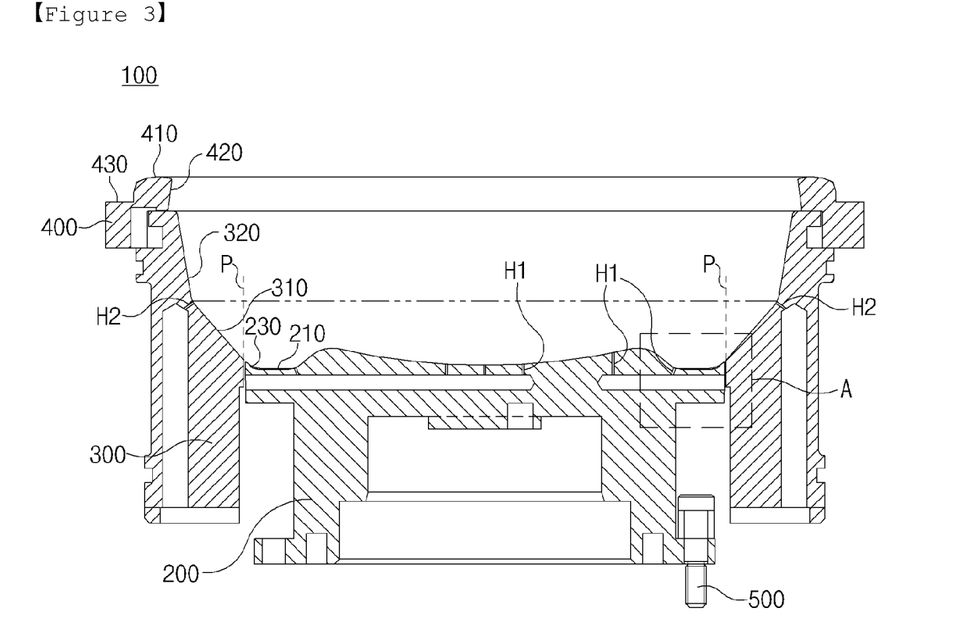

Specifically, referring to FIGS. 3 and 6, the first mold part 200 may include the bottom molding part 210 and the side molding part 230. The bottom molding part 210 may form the bottom portion 20 of the container 10 and may be provided to correspond to the shape of the bottom portion 20 of the container 10 to be formed.

The side molding part 230 may form a lower portion which is a part of the side portion 30 of the container 10, and may extend to be inclined upward from the bottom molding part 210. That is, the first mold part 200 may form a part of the lower portion of the bottom portion 20 and the side portion 30 of the container 10.

Figure 4:
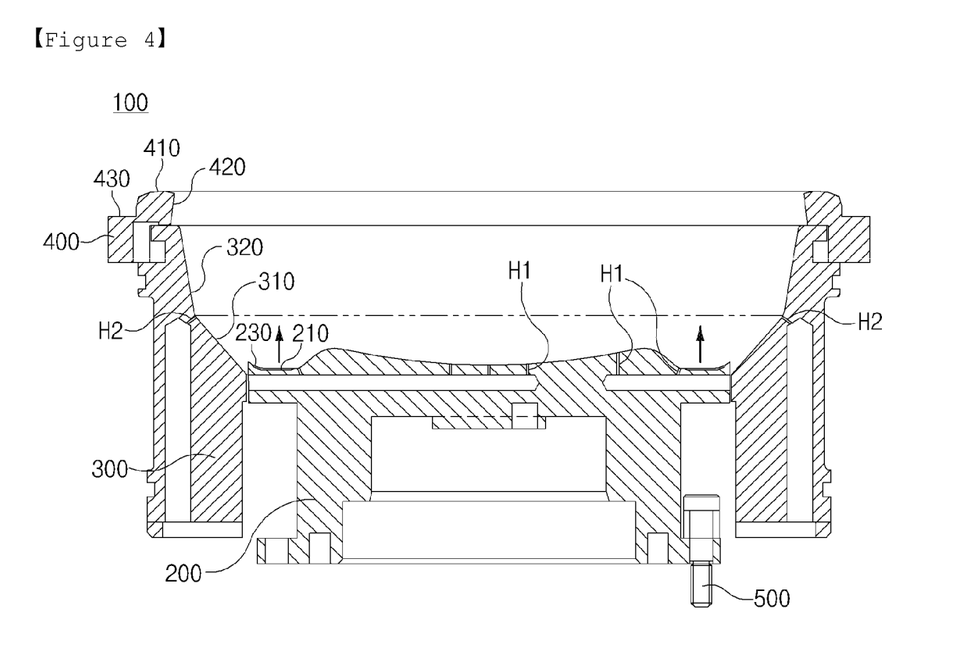

In addition, referring to FIG. 4, the first mold part 200 may be provided to be lifted upwardly. Specifically, when the forming of the container 10 is completed, the first mold part 200 is lifted upwardly to press the container 10, thereby separating and taking out the container 10 from the second mold part 300. That is, the first mold part 200 may serve as a knockout for ejecting a formed product in which the forming is completed.

The second mold part 300 is disposed outside the first mold part 200 and forms the remaining portion except for the part of the side portion 30. Here, the second mold part 300 may be a cavity mold together with the first mold part 200.

Specifically, the second mold part 300 may be disposed around the outer circumference of the first mold part 200 to form the side portion 30 of the container 10. That is, the second mold part 300 may form the side portion 30 of the container 10 together with the side forming part 230 of the first mold part 200. More specifically, the upper portion of the side portion 30, which is a portion excluding a part of the lower portion of the side portion 30 formed by the side forming part 230, may be formed. In FIG. 3, H1 and H2 (not illustrated) are vacuum air holes for vacuum suction for bringing the sheet into close contact with the first mold part 200 and the second mold part 300.

As described above, in the container forming apparatus 100 according to the present invention, the first mold part 200 serving as a knock-out has a structure formed to include not only the bottom portion 20 of the container 10 but also the side portion 30 of the container 10 to press the side portion 30 of the container 10 to be included when taking out. Accordingly, when the container 10 is taken out, it is possible to facilitate the taking-out by further increasing a pressing force and improve poor mold release such as crushing of the bottom surface of the container 10.

Specifically, as Comparative Example illustrated in FIG. 7, when the first mold part 200 is provided to press only the bottom portion 20 of the container 10, an appropriate pressing force is not applied to the container 10, so that it may be difficult to be taken out and crushing of the bottom surface of the container 10 may occur. In particular, in the case of forming a thin sheet, when pressing a narrow surface of the bottom of the container 10, the bottom of the container 10 may be crushed. Accordingly, it may be advantageous to press the side portion 30 that may receive a relatively larger force. Accordingly, according to the present invention, the first mold part 200 presses the side portion 30 of the container 10 to be included, thereby improving such poor mold release.

In addition, according to the present invention, when taking out, the first mold part 200 and the second mold part 300 are separated from the side portion 30 of the container 10, so that a parting line P (see the stepped portion 33 of FIGS. 1 and 2) may be formed on the side portion 30 of the container 10. In the parting line P formed on the side portion 30 of the container 10, the stepped portion 33 in the form of a rib protruding finely is formed to reinforce the strength of the side portion 30 of the container 10.

Accordingly, it is possible to minimize the contractional deformation of the container 10 in the product packaging and distribution process of the container 10.

Specifically, the container 10 packaging foods such as aseptic cooked rice and the like is sealed and packaged in a hot state, and may be naturally or forcibly subjected to a cooling process. At this time, as the hot air is cooled, air contraction occurs, so that the pressure inside the container 10 may become a negative pressure state that is lower than that of the outside. As such, when the negative pressure is applied, a thin portion or a portion subjected to excessive force of the container 10 may be easily contracted and deformed, and particularly, the side portion 30 of the container 10 is frequently contracted and deformed. Accordingly, in the container 10 according to the present invention, a rib (stepped portion) by the parting line P is formed on the side portion 30 of the container 10 to reinforce the strength of the side portion 30 of the container 10, thereby minimizing product defects due to such contractional deformation.

In addition, according to the present invention, the side portion 30 of the container 10 is pressed to be included when taking out, thereby minimizing defects occurring on the bottom portion 20 of the container 10 by the angle of the skirt 42 when taking out. Specifically, the skirt 42 is configured at the angle as described above and is a portion having an inverted tapered structure, and a lot of force is applied to the when taking out, and in particular, in the case of molding using a thin sheet such as a container for instant food, the deformation rate of the bottom portion is high when pressing the bottom portion 20.

However, when a small area of the bottom portion 20 of the container 10 is pressed when taking out, the stress may be concentrated to increase a defect rate. Accordingly, according to the present invention, since a large area of the bottom portion is pressed when taking out and the side portion 30 including an inclined surface is pressed, the force applied to the bottom portion 20 may be distributed over a large area. As a result, even in the case of forming the container having the skirt 42 having an inverted tapered structure using the thin sheet according to the present invention, it is possible to minimize the deformation of the bottom portion 20.

Meanwhile, as described above, the side portion 30 of the container 10 may include a first side surface 31 which extends to be inclined upward from the bottom portion 20 and has a first slope with respect to the bottom surface of the bottom portion 20, and a second side surface 35 which extends to be inclined upward from the first side surface 31 and has a second slope with respect to the bottom surface. In addition, the side forming part 230 provided in the first mold part 200 may be formed to be inclined with the first slope.

Here, the first slope and the second slope may be the same as or different from each other, and more specifically, the first slope may be provided more gently than the second slope. Accordingly, the first mold part 200 presses a portion of the side portion 30 of the container 10 with a gentle slope at the bottom. Accordingly, even if the first mold part 200 presses the side surface of the container 10, there is an advantage that the upper end portion 40 of the container 10 is not broken.

In addition, the inclination angle of the side portion 30 of the container 10 is not limited, and may be provided at, for example, about 15° or more with respect to the bottom surface. However, the present invention is not limited thereto, and the inclination angle may be modified at various angles if the damage to the upper end portion 40 may be prevented when the first mold part 200 presses the container 10.

Meanwhile, referring to FIGS. 3 and 4, the second mold part 300 may include a first inclined surface 310 and a second inclined surface 320.

The first inclined surface 310 is inclined at the first slope with respect to the reference surface of the bottom forming part 210 at the same angle as the bottom surface, and may form a first side surface 31 together with the side forming part 230. In addition, the second inclined surface 320 may extend from the first inclined surface 310, inclined at the second slope with respect to the reference surface, and form a second side surface 35.

Referring to FIG. 2, the first side surface 31 provided on the side portion 30 of the container 10 may include a first region 31a and a second region 31b. The first region 31a is a region that continues from the bottom part 20, and the second region 31b may be located above the first region 31a. In addition, on a cross section perpendicular to the bottom portion 20 (see FIG. 2), the length of the first region 31a may be shorter than the length of the second region 31b.

In addition, the side forming part 230 of the first mold part 200 forms the first region 31a, and the first inclined surface 310 of the second mold part 300 may form the second region 31b. Accordingly, the first mold part 200 and the second mold part 300 may be separated between the first region 31a and the second region 31b when taking out.

More specifically, the side portion 30 further includes a stepped portion 33, and the stepped portion 33 is located between the first region 31a and the second region 31b and may protrude stepwise along a circumferential direction on an outer circumferential surface of the first side surface 31. That is, the stepped portion 33 may be formed on the parting line P where the first mold part 200 and the second mold part 300 are separated. Here, since the length of the first region 31a is shorter than the length of the second region 31b, the stepped portion 33 may be formed adjacent to the bottom portion 20.

Meanwhile, the second mold part 300 may be spaced apart at a predetermined interval from the first mold part 200 to the outside. More specifically, the first inclined surface 310 may be spaced apart at a predetermined interval from the side forming part 230 (see d of FIG. 5).

As such, since the first mold part 200 and the second mold part 300 are provided to be spaced apart from each other, it is possible to prevent abrasion due to the lifting operation of the first mold part 200 when taking out. In addition, since the size of the stepped portion 33 formed on the parting line may be further increased by a distance d between the first mold part 200 and the second mold part 300, the strength of the side portion 30 of the container 10 may be further reinforced.

Here, the distance d between the first mold part 200 and the second mold part 300 may be variously applied, and may be provided with, for example, about 0.3 mm. However, the distance d between the first mold part 200 and the second mold part 300 is not limited thereto, and may be modified in various sizes if the distance may prevent abrasion due to the lifting operation.

Meanwhile, the present invention may further include a driving part (not illustrated) and a guide part 500.

The driving part may drive the first mold part 200 upward. As long as the driving part may drive the first mold part 200 upward, the type thereof is not limited. For example, the first mold part 200 may be driven by a cam member or air pressure, but the present invention is not limited thereto.

The guide part 500 may guide the vertical movement of the first mold part 200. The guide part 500 may be provided in the form of a guide shaft like the illustrated example, but is not limited thereto.

Meanwhile, referring to FIG. 3, the present invention may further include a third mold part 400.

The third mold part 400 may include a skirt forming part 420 and a flange forming part 410. In addition, the third mold part 400 may further include a cutting part 430. The skirt forming part 420 is provided on the upper side of the second mold part 300 to form the skirt 42 of the container 10, and the flange forming part 410 may form a flange 41 of the container 10.

In addition, the cutting part 430 may be provided outside the flange forming part 410 to cut the container 10 in which the forming is completed.

Hereinafter, as another aspect of the present invention, a container forming method will be described with reference to FIGS. 3 to 6 and 8.

The container forming method according to the present invention includes a heating step (S110), a thermoforming step (S130), and a taking-out step (S170). In the heating step (S110), a sheet to be formed into the container 10 is heated.

In the thermoforming step (S130), the heated sheet is press-fitted in the first mold part 200 forming a part of the bottom portion 20 and the side portion 30 of the container 10 and the second mold part 300 provided outside the first mold part 200 and forming the remaining portion except for the part of the side portion 30 and comes into close contact with the first mold part 200 and the second mold part 300 by injection of compressed air and vacuum suction to form the bottom portion 20 and the side portion 30.

Specifically, when the sheet having a predetermined thickness is heated at a temperature suitable for forming, the sheet may be first press-fitted into the first mold part 200 and the second mold part 300 using a plug. In addition, by injecting compressed air, the sheet may come into close contact with the first mold part 200 and the second mold part 300. At this time, the sheet may be brought into close contact with the sheet by vacuuming the first mold part 200 and the second mold part 300 by vacuum suction. Accordingly, the bottom portion 20 and the side portion 30 of the container 10 may be formed. In the thermoforming step (S130), the upper end portion 40 of the container 10 may be formed through the third mold part 400.

In the cutting step (S150), the container 10 in which the forming is completed may be cut. The cutting step (S150) may be performed before or after the taking-out step (S170). Hereinafter, a case in which the cutting step (S150) is performed before the taking-out step (S170) is described as an example, but is not limited thereto, and the cutting step (S150) may be performed before or simultaneously with the taking-out step (S170).

In the taking-out step (S170), the first mold part 200 is lifted upwardly, and the container 10, in which the forming is completed, is separated from the second mold part 300 and taken out.

Specifically, in the taking-out step (S170), when the container 10, in which the forming is completed, is cut, the container 10 may be taken out. Referring to FIG. 4, while the first mold part 200 is lifted upwardly, the container 10 may be separated from the second mold part 300, and the separated container 10 may be taken out. A series of thermoforming steps including the heating step (S110), the thermoforming step (S130), the cutting step (S150), and the taking-out step (S170) may be performed at high speed in a short time.

Meanwhile, in the thermoforming step, the stepped portion 33 may protrude stepwise from the side portion 30 through a spaced gap between the first mold part 200 and the second mold part 300.

Hereinafter, as yet another aspect of the present invention, an instant food packaging method using a container will be described.

The packaging method of instant food using a container according to the present invention includes preparing a container, putting instant food into the container, sealing the container, and cooling the container.

So long as the instant food applied to the present invention requires cooling in the packaging process, the type thereof is not limited, and for example, the instant food may include instant rice, instant soup, instant porridge, and the like, but is not limited thereto.

In the sealing of the container, the means and method for sealing the container are not limited, and various materials and methods may be applied. For example, the upper end of the container may be sealed by using a lead film.

In the cooling of the container, the cooling temperature may be applied without limitation as long as the temperature is a temperature lower than the temperature of the instant food in the putting of the instant food into the container.

According to the present invention, in the container forming apparatus and the container forming method, the first mold part serving as a knock-out has a structure formed to include not only the bottom portion of the container but also the side portion of the container to press the side portion of the container to be included when taking out. Accordingly, when the container is taken out, it is possible to facilitate the taking-out by further increasing a pressing force and improve poor mold release such as crushing of the bottom surface of the container.

Further, according to the present invention, since the stepped portion protrudes from the side portion of the container, the strength of the side portion of the container is reinforced, thereby minimizing product defects due to contractional deformation of the container.

While the specific embodiments of the present invention have been described above, the spirit and scope of the present invention are not limited to these specific embodiments, and various modifications and variations can be made without changing the subject matter of the present invention disclosed in the appended claims by a person with ordinary skill in the art to which the invention pertains.

The invention claimed is:

1. A container forming apparatus for forming a container by thermoforming, comprising:
   a first mold part which includes a bottom forming part for forming a bottom portion of the container and a side forming part for extending to be inclined upward from the bottom forming part and forming a part of a side portion of the container and is lifted upward to separate and take out the container in which the forming is completed to press the container;
   a second mold part which is disposed outside the first mold part and forms the remaining portion except for the part of the side portion,
   wherein the second mold part is provided to be spaced apart at a predetermined interval from the first mold part to form a stepped portion protruding stepwise from the side portion,
   wherein the side portion of the container includes a first side surface which extends to be inclined upward from the bottom portion and has a first slope with respect to the bottom surface of the bottom portion, and a second side surface which extends to be inclined upward from the first side surface and has a second slope with respect to the bottom surface,
   wherein the side forming part of the first mold part is formed to be inclined at the first slope, and the second mold part comprises:
      a first inclined surface which is inclined at the first slope with respect to a reference surface of the bottom forming part at the same angle as the bottom surface and forms the first side surface together with the side forming part,
   wherein the first side surface includes a first region which is a region that continues from the bottom part and a second region located above the first region,
   wherein the side forming part of the first mold part forms the first region, and the first inclined surface of the second mold part forms the second region, and
   wherein the stepped portion is located between the first region and the second region and protrudes stepwise along a circumferential direction of the first side surface.

2. The container forming apparatus of claim 1, wherein the first slope is provided more gently than the second slope.

3. The container forming apparatus of claim 1, wherein the second mold part comprises:
   a second inclined surface which extends from the first inclined surface, inclined at the second slope with respect to the reference surface and forms the second side surface.

4. The container forming apparatus of claim 3, wherein on a cross section perpendicular to the bottom portion, the length of the first region is shorter than the length of the second region.

5. The container forming apparatus of claim 4, wherein the first inclined surface is provided to be spaced apart at the predetermined interval from the side forming part to form the stepped portion.

6. The container forming apparatus of claim 1, further comprising:
   a driving part configured to drive the first mold part upwardly; and
   a guide part configured to guide the vertical movement of the first mold part.

7. The container forming apparatus of claim 1, further comprising:
   a third mold part provided on the upper side of the second mold part and including a skirt forming part forming a skirt of the container and a flange forming part forming a flange of the container.

8. The container forming apparatus of claim 7, wherein the third mold part further includes a cutting part which is provided outside the flange forming part to cut the container on which the forming is completed.

* * * * *